Jan. 2, 1962
C. A. PETHYBRIDGE ET AL
3,015,116
THREADING ATTACHMENT WITH CHANGE SPEED
TRANSMISSION FOR REVERSING TOOL
SPINDLE ROTATION
Original Filed Sept. 29, 1954
3 Sheets-Sheet 3
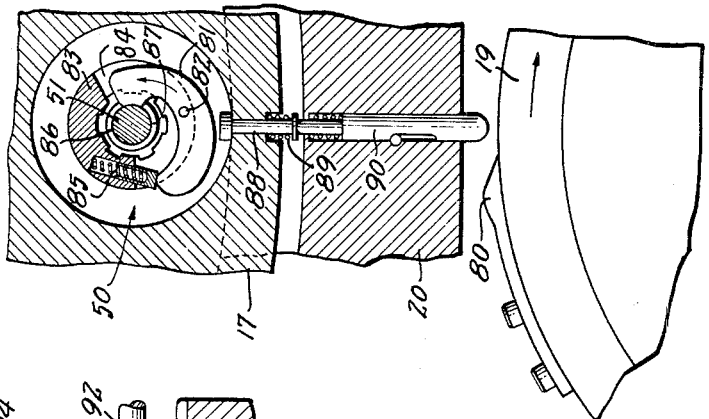
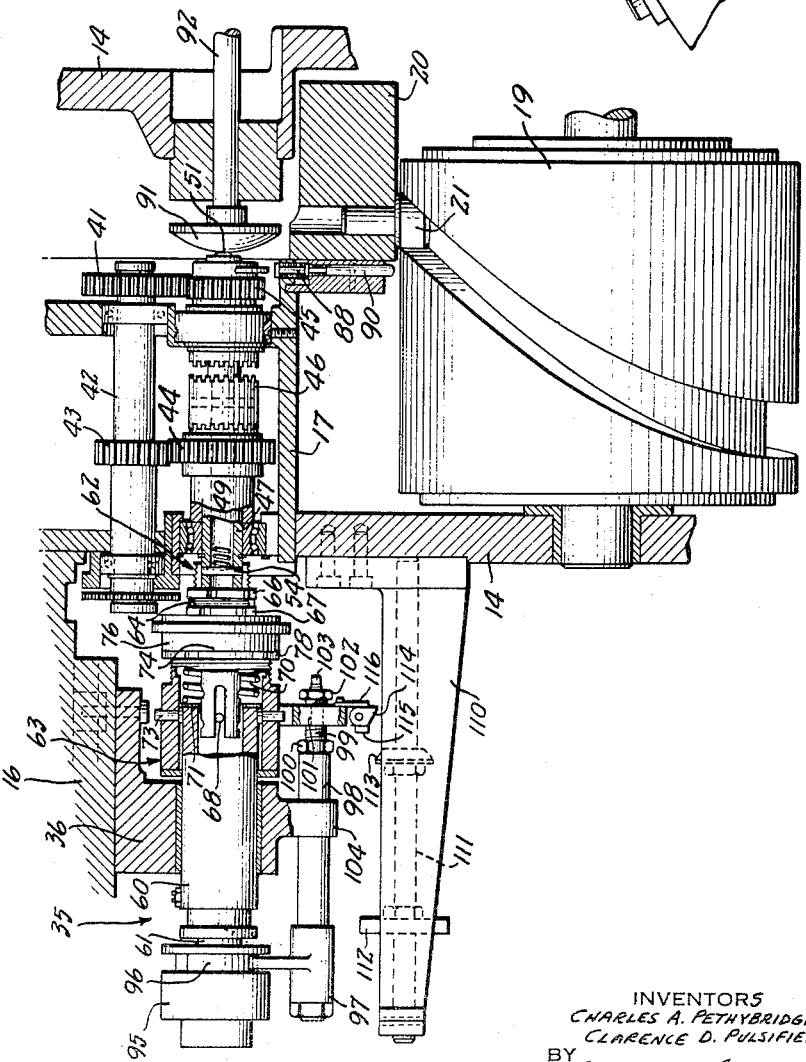
INVENTORS
CHARLES A. PETHYBRIDGE
CLARENCE D. PULSIFIER
BY
Mitchell & Bechert
ATTORNEYS

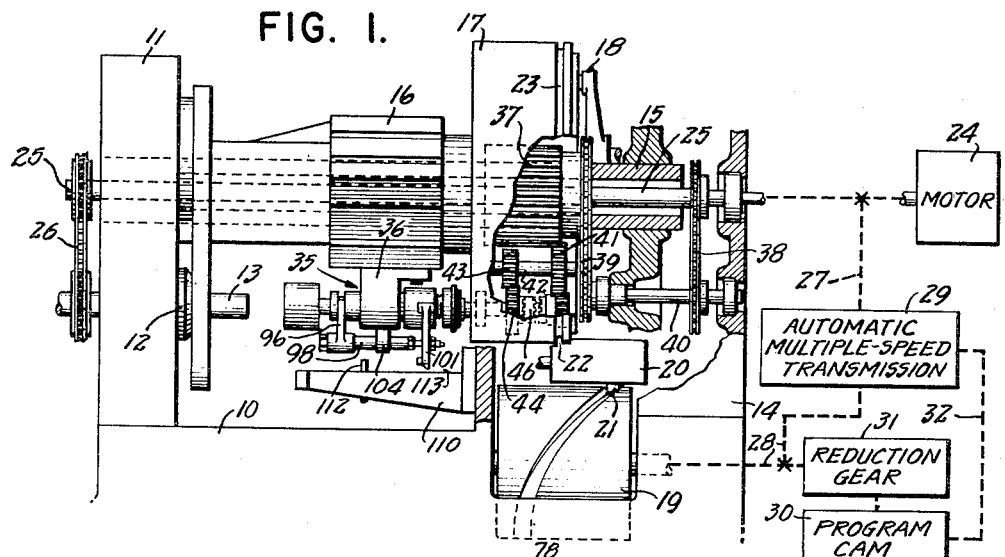

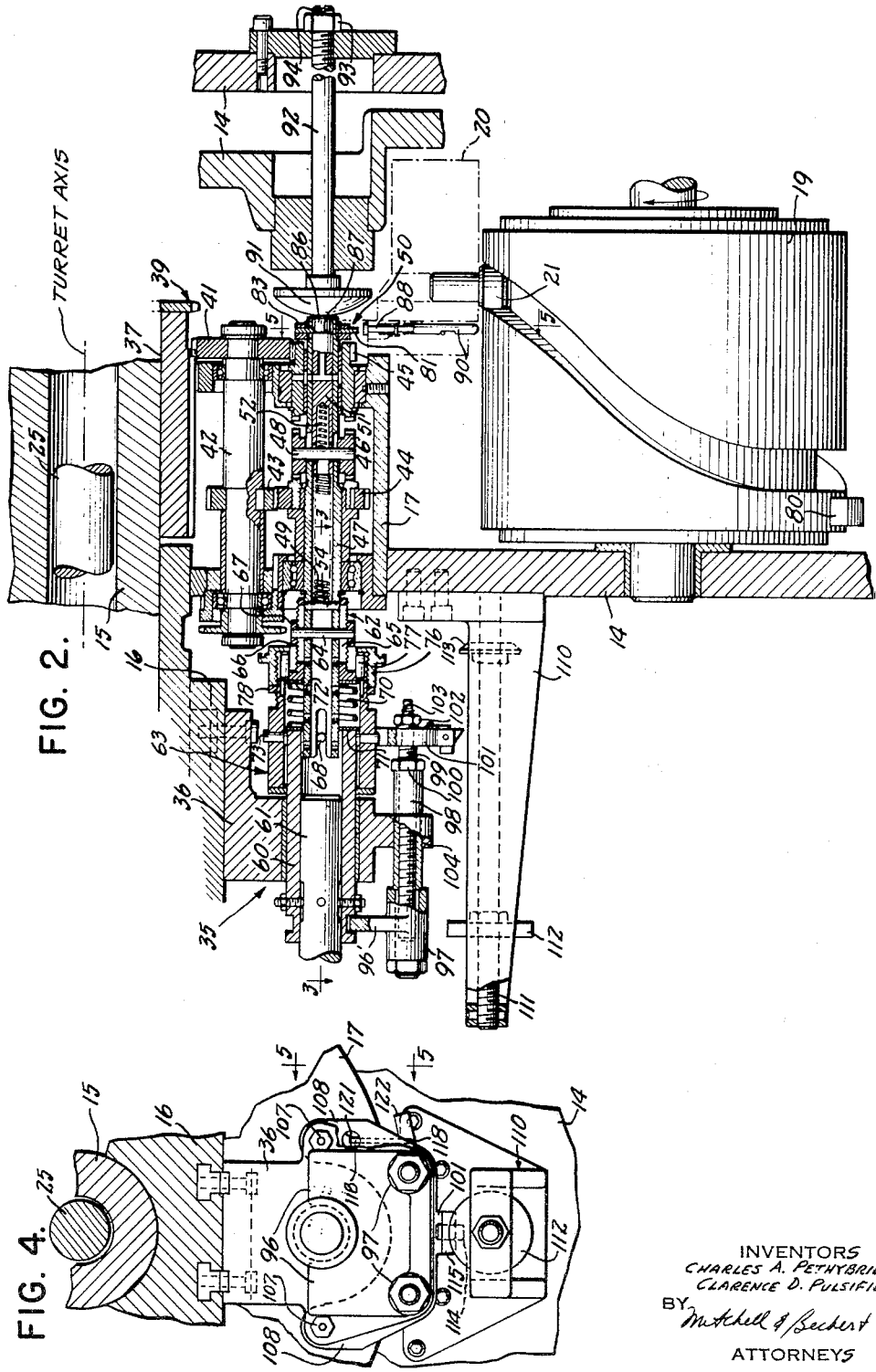

United States Patent Office 3,015,116
Patented Jan. 2, 1962

3,015,116
THREADING ATTACHMENT WITH CHANGE SPEED TRANSMISSION FOR REVERSING TOOL SPINDLE ROTATION
Charles A. Pethybridge, New Britain, and Clarence D. Pulsifer, deceased, late of Farmington, Conn., by Marguerite B. Pulsifer, executrix, Farmington, Conn.; said Charles A. Pethybridge and Clarence D. Pulsifer assignors to The New Britain Machine Company, New Britain, Conn., a corporation of Connecticut
Original application Sept. 29, 1954, Ser. No. 459,118, now Patent No. 2,923,015, dated Feb. 2, 1960. Divided and this application Oct. 14, 1959, Ser. No. 846,513
6 Claims. (Cl. 10—138)

Our invention relates to threading means for a machine tool, and in particular to automatically operated threading mechanism applicable to a turret lathe as of the type described in Montgomery et al., U.S. Patent No. 2,680,281.

This application is a division of our co-pending application Serial No. 459,118, filed September 29, 1954, for Threading Attachment, now U.S. Patent No. 2,923,015.

It is an object of the invention to provide improved means of the character indicated.

It is another object to provide an automatic threading attachment for a turret lathe, said attachment being of such basic compactness and versatility either that it may be applied at a selected one of several stations on the turret or that it may be applied in multiple at a corresponding plurality of such stations at any one time, thus enabling different threading operations to take place on the same piece of work at different turret stations.

It is an object to meet the above objects with mechanism inherently applicable to performing operations with self-opening dies, with collapsing right-hand or left-hand taps, and with sensitive or releasing-type tap and die holders, in addition to providing reversing threading for taps and dies of the non-opening or non-collapsing type.

It is a further object to provide in conjunction with such mechanism suitable frame-based tripping means at the working station and effective to make the threading spindle and rotating tool carried thereby at one station operative in accordance with a first desired cycle while at the same time permitting a different threading tool carried at a different turret station to function with a different cycle.

It is a specific object to provide an improved threading spindle for devices of the character indicated.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a simplified view of a machine incorporating features of the invention, the view being in side elevation and partly broken away to reveal internal parts, some of which are shown in longitudinal vertical section;

FIG. 2 is an enlarged vertical sectional view through the turret axis and through the axis of a threading spindle at the working station in the machine of FIG. 1, the set-up being illustrative of automatic reversing-threading operation;

FIG. 3 is an enlarged fragmentary view of a part of the spindle of FIG. 2, but shown in the horizontal sectional plane 3—3 of FIG. 2, the section of FIG. 2 being designated in FIG. 3 as in the plane 2—2 of FIG. 3;

FIG. 4 is a left-end elevation of the parts shown in FIG. 2;

FIG. 5 is an enlarged fragmentary view of the plane 5—5 of FIG. 2;

FIG. 6 is a view similar to FIG. 2, but showing connections for operation with a self-opening or collapsing tool, without reversing threading; and FIG. 7 is an enlarged fragmentary view of safety mechanism utilized in the arrangement of FIG. 6.

Briefly stated, our invention contemplates a novel employment of threading means in a turret lathe. The threading spindle is continuously driven and is carried at one station of the turret, and it is so devised that it may be provided in multiple at each of a variety of turret stations. The arrangement is such that no special provision is necessary for feeding the threading tool, in that the dwell on the turret feed cam is utilized to provide a substantial period during which threading takes place. For most applications and for simpler set-ups, it is convenient to rely substantially only on the dwell period for accomplishment of threading functions, but for unusually long threads of relatively short pitch, provision is made for starting threading during the rise of the main cam and, therefore, prior to attainment of the dwell. The threading spindle and threading-tool holder are keyed to each other with substantial axial lost motion so as to permit the chasers to do all the threading feed, and the engagement of the threading-tool holder with the threading spindle is characterized by resiliently loaded follow-up clearance to allow for variation in tool take-up on the work from piece to successive piece. Provision is made for a wide range of adjustment of the follow-up clearance, and independent provision is made for wide range of adjustment of the resilient loading, whereby starting pressure may be adjustably selected.

Referring to FIG. 1 of the drawings, our invention is shown in application to a turret lathe of the type described in greater detail in said Montgomery et al. patent. Said lathe may thus comprise a bed 10 with an outboard pedestal 11 in which a work-rotating spindle 12 is journalled. The spindle 12 will be understood to include means, such as a collet (not shown) for supporting work, such as bar stock 13, projecting to receive a threading operation. At the other end of the machine, the main works may be contained in power case 14, and a turret stem 15 may be firmly based both in the power case 14 and in the outboard pedestal 11.

The turret 16 is axially slidable on the stem 15 on an axis offset from but parallel to the spindle axis. The turret 16 may include a plurality of working stations suitably grooved or otherwise formed to mount tools for operation on the work 13 at each of a plurality of successive working stations. The turret 16 is shown to include at the rear end thereof a drum 17, which in the retracted position may be substantially fully contained within the power case 14. Indexing is accomplished by Geneva means including an arm 18 engageable with a suitably formed index plate carried on the back end of the drum 17. The arm 18 rotates in essentially a single radial plane and is not longitudinally reciprocated with feed of the turret 16 and associated drum 17, but the drive to the arm 18 is so synchronized with the feed cycle for the drum and turret as to assure unfailing register of the indexing parts when the turret has accomplished a feed cycle and is to be indexed to the next working station, all as described in detail in said patent.

Feed for the turret may be derived from a main cam 19 journalled in the frame and driving a turret crosshead 20 intermediate the cam 19 and the drum 17. A follower roll 21 on the turret crosshead 20 rides the cam groove, and feed thrusts are imparted to the turret drum 17 by projecting means 22 on the feed slide 20 and riding a peripheral groove 23 at the rear end of the turret drum.

Drive to all rotating parts may be derived from a single motor 24 and imparted to the spindle 12 by way of a shaft 25 within the stem 15; sprocket means 26 is shown connecting the shaft 25 to the spindle 12. The dashed lines 27—28 will be understood to suggest further direct mechanical connection of the motor 24 to the feed cam 19, and at 29 automatic multiple-speed transmission means is provided to assure a correct speed for the feed cam; the transmission means 29 may be of the type disclosed in pending patent application, Serial No. 145,999, filed February 24, 1950, in the name of Charles A. Pethybridge. In order that the machine may be self-cycling throughout a full automatic program, suitable program-cam means 30 may be driven through reduction-gear means 31 (representing such subdivision of rotation of cam 19 as corresponds to the number of turret stations), thereby determining a full program cycle, including feed cycles at all working positions of the turret 16. The dashed line 32 suggests automatic control (by the program cam 30) of speed selection in the transmission means 29, all as described in greater detail in the aforementioned patents.

In accordance with the invention, a complete self-contained automatic threading mechanism is bodily carried by the turret means 16—17 within such confined space as to permit application of a similar threading mechanism at the next adjacent station of the turret 16. Essentially, the spindle parts 35 are carried at a forward location and are supported by a base member 36, suitably anchored to the turret 16, while the drive parts are carried by and contained within the drum 17.

Basic drive for threading attachments regardless of turret station is available from elongated gear means 37 within the turret drum 17 but axially fixed so as not to be reciprocated with feed of the turret. The gear 37 is shown connected to the drive shaft 25 by way of first and second sprocket drives 38—39, via a jack shaft 40. The gear drives carried by the turret include a take-off gear 41 continually meshing with the drive gear 37 and, in FIGS. 1 and 2, shown at the back end of the gear 37 because the parts are illustrated in retracted position. As better seen in FIG. 2, the gear 41 is mounted on a jack shaft 42 and, through change gears 43—44, directly drives the spindle 35 at a first speed. Gear 41 also meshes with a second gear 45 to determine a second speed on the spindle axis, and clutch means 46 between the two gears 44—45 serves to select whether the slower spindle speed shall be available from gear 44 or the faster spindle speed shall be available from gear 45. If the gear ratios to gears 44—45 are selected to produce speeds respectively above and below the drive speed for spindle 12, then a shifting of clutch 46 may determine the proper directions of relative motion for threading-on or threading-off of tool means carried by the spindle 35, as will be understood.

For purposes which will later be made clear, the clutch shifter 46 is preferably normally in engagement with one of the drives and is poised for automatic tripping out of such engagement and into engagement with the other drive. In the form shown (FIG. 2), the shifter 46 is a sleeve riding a drive spindle or tube 47 on which both drive gears 44—45 are freely rotatable. The sleeve 46 is keyed to the drive tube 47 by means of a pin 48 extending diametrically across the sleeve 46 and driving opposed longitudinal slots of limited axial length in the tube 47. Dog teeth at opposite ends of the clutch 46 are selectively engageable with mating dog teeth on the gears 44—45 (or on mounting means therefor) in order to impart selected drive speeds to the tube or spindle 47. Relatively strong compression spring means 49 is continuously preloaded to shift clutch means 46 from the position shown, into engagement with gear 45, and latch means 50, to be described in greater detail, hold the clutch in engagement with gear 44. A rod 51 connects the latch means 50 with the clutch 46, and a relatively light compression spring 52 is shown urging clutch pin 48 (and therefore clutch 46) into engagement with gear 44, as permitted by limited axial lost motion between the clutch pin 48 and the slot through which it engages rod 51. A retaining pin 54 carried by the drive spindle 47 holds the spring 49 preloaded against the forward end of the latched rod 51, in readiness to shift clutch means 46 out of engagement with gear 44 and into engagement with gear 45 upon release of latch 50, as will later be more clear.

As explained in general terms above, our threading mechanism requires no special feeds beyond the turret feed induced by the cam 19, and all or a substantial part of the threading operation may be achieved during the dwell of the cam 19, reliance being made on the chasers in the tap or die head to determine the threading feed on the work. This type of operation contemplates that the feed imparted by the cam 19 shall only be used to start the threading cut on the work and, for this purpose, we incorporate in the threading-spindle mechanism a resiliently loaded follow-up clearance, with provision for not only adjusting the longitudinal magnitude of this clearance, but also for separately adjusting the extent of loading for any given follow-up clearance; such loading is usually referred to as starting pressure.

The construction of the threading spindle can best be understood by reference to FIGS. 2 and 3 wherein the spindle tube 60 is seen to be journalled in suitable bearing means in the support 36 and to incorporate means for reception and securing of the shank 61 of a tool (or of a releasing-type tap or die holder); the tool and the tool holder or spindle tube 60 may thus be understood as threading-tool means. In order to connect the spindle tube 60 with the drive tube 47, we provide novel adjustable connecting means in the form of a first sleeve portion 62 (longitudinally positionable on the drive tube 47) and a second sleeve portion 63 (longitudinally slidably related to the threading spindle 60).

The rear sleeve portion 62 is preferably firmly referenced to the drive tube 47, and we show means whereby this reference may be adjustably selected. In the form shown, and depending upon set-up conditions, pin means 64 is carried in one of a plurality of axially spaced diametrically opposed holes and projects radially outwardly through elongated slots 65 in the sleeve portion 62. The outer part of sleeve portion 62 is preferably threaded, and clamp nuts 66—67 are secured against opposite sides of the projecting ends of pin 64 in order to achieve the desired longitudinal reference to the drive tube 47. The connection between the other sleeve portion 63 and the spindle tube 60 is preferably characterized by lost motion, as determined by a diametrically extending pin 68 carried by the spindle tube 60 and slidable in elongated slots 69 in the sleeve portion 63. The extent of this lost motion is preferably at least adequate to accommodate the maximum threaded advance ever to be achieved on work during the dwell of the feed cam 19, plus a slight allowance for follow-up clearance. For feeds of greater extent, threading must be initiated during the feed rise of cam 19 and therefore prior to occurrence of the dwell.

In order to establish a resiliently loaded follow-up clearance, we utilize a single relatively stiff spring 70, shown compressed between washers 71—72 riding the spindle tube 60 and the sleeve member 62—63, respectively. Abutment means, such as pins 73 carried by the sleeve portion 63, are poised to intercept the washer 71, thereby determining a limit of expansion for the spring 70. External spring means 74 resiliently load the spindle tube 60 toward the retracted limit of lost motion and, therefore, against the washer 71; thus, with the washer 71 compressed by spring 70 against abutment means 73, the resiliently loaded limit of lost motion is determined. The extent to which lost motion permits spindle tube 60 to be driven further back (in further compression of the spring 70) is the extent of follow-up clearance and may be visually appreciated by the axial extent of the space 75 in FIG. 3.

It will be seen that, inasmuch as the abutment pins 73 are carried by the connecting member 62—63, and since the nuts 66—67 adjustably position said member 62—63 relatively to the drive spindle 47, said nuts 66—67 (together with pin 64) constitute the means whereby the follow-up clearance may be adjusted. In other words, by simple adjustment of the location in which nuts 66—67 are tightened against the drive pin 64, the clearance 75 may be selectively adjusted.

In the process of making this adjustment, there will necessarily have been a slight change in the compressional loading of spring 70, but once having made the adjustment for follow-up clearance, we provide independent means for selectively controlling the resilient loading on the spring 70, so as to determine starting pressure. In the form shown, the starting-pressure adjustment is made by positioning a nut 76, shown threaded to the connecting member 62—63 and having an inwardly projecting skirt for compressionally driving an angularly spaced plurality of loading pins 77, said pins 77 being guided in member 62—63 for longitudinal displacement and in abutting relation with the spring-loading washer 72 (see FIG. 2). A lock-nut 78 may secure the nut 76 once the adjustment has been made. The loading forces available for various adjustments of nut 76 may be precalibrated and charted, so that in setting up the machine to perform a particular threading operation, the set-up man need only caliper the axial space between nut 76 and a given reference (such as pin 73) on sleeve part 63 in order to be sure of establishing the correct starting pressure.

As indicated generally above, various arrangements of automatic trip devices may be employed to determine threading operations, and the manner of employment of such devices will depend upon the particular type of threading tool or tool holder employed. The arrangement of FIGS. 2, 3 and 4 happens to be shown adapted for reversing-threading operations, whether taps or dies, and the trip mechanism in that case may involve the use of a thread-off or reversing-trip cam 80 carried by the main cam 19, said cam 80 being variously positionable during or substantially at termination of the feed-cam dwell, depending on the needed length of thread on the work piece 13. The reversing-trip action involves the use of the latch previously designated generally at 50 and shown in greater detail in FIG. 5. This latch mechanism may employ an arcuately extending latch member 81 pivotally supported at 82 in the tail end of the drive tube or spindle 47 or in a hub member 83 keyed thereto. The member 83 may be circumferentially notched at 84 to accommodate the thickness of the latch member 81 and to allow free rocking action thereof in response to the light resilient loading afforded by spring means 85. When in the position shown in FIGS. 2 and 5, the latch member 81 is set so as to ride the reduced end 86 of the clutch shift rod 51, thus intercepting rod 51 against rearward displacement in response to spring 49, by abutment against the shoulder 87 on rod 51.

Since the described latch assembly is carried by the drive spindle 47, it is continuously rotated (in the direction indicated by the arrow in FIG. 5), and tripping may occur whenever a trip pin 88 is sufficiently projected to intercept the tail of latch member 81. The trip pin 88 is carried by the turret drum 17 and is normally urged by spring 89 away from engagement with the latch member 81. Of course, since pin 88 is carried by the turret drum, it will be indexed and only when it is in the working position shown in FIG. 5 will pin 88 align itself with another trip pin 90 slidably carried in the turret crosshead 20.

The pin 90 may be spring-urged to the retracted position and, since it is poised to ride on cam 80, it will be actuated once for every cycle of the main feed cam 19. However, since the trip pin 88 aligns itself with pin 90 only when the threading spindle is in the working station, there is no tripped operation of the latch means 50, except at the working station. By virtue of the placement of cam 80 on cam 19, the latch means 50 is tripped only upon completion of the desired threading, which, as previously indicated, will depend on the kind of thread to be cut and may be substantially at completion of the dwell on cam 19.

Upon tripping the latch means 50, the clutch-shift rod 51 is free to displace rearwardly (with spring-urged snap action, to the right in the sense of FIG. 2), thus connecting the higher-speed drive from gear 45 to the threading spindle 35. This higher speed represents something in excess of the work-rotated speed (spindle 13), and the net result may be to unthread the threading tool from the work. During the reverse or unthreading operation, the excess of threading-spindle speed over the work-spindle speed is preferably such as to effect at least as fast a chaser-driven retraction of the threading tool as the speed of retraction dictated by the drawback slope of the feed cam 19, thereby avoiding damage to the tool.

By the time the turret has become fully retracted, the threading tool will long since have parted company with the work, and use the occasion to reset the threading-spindle speed to that used for the next threading operation. In the form shown, this is done by means of a fixed abutment member 91 securely anchored to the frame, as by means of an elongated rod 92, lock-nutted at 93 (FIG. 2) to a rearwardly accessible part of the power case 14. The projecting part of the rod 92 is shown grooved at 94 to accommodate a tool, whereby small adjustments may be made in the longitudinal position of the abutment member 91. Finally, on the chance that the latch mechanism 50 may inadvertently have tripped or have failed to reset by the time the threading spindle comes back again to the working station, we prefer that the nose end of the abutment 91 shall be suitably sloped to constitute a cam surface effective on the final stages of indexing into the working position to actuate the projecting end 86 of the clutch shift rod 51 back into the position calling for drive via gear 44, thus enabling latch means 50 to reset and reconditioning the mechanism for a thread-cutting operation.

As indicated generally above, our mechanism is inherently adaptable also to operation of threading tools of the type in which the cutting elements may be automatically or selectively actuated into and out of cutting engagement with the work. Such tools will not require reversing of the relative rotation of the tool and work and, therefore, in such cases the thread-off or reversing-trip cam 80 may be removed. This situation is depicted in FIG. 6, and we have shown at 95 a tool of the movable-element type, such as a self-opening die having an axially shiftable actuating sleeve, with a peripheral groove driven by a suitable fork 96. The fork 96 will, of course, have to be of size appropriate to the particular die head used and, therefore, it forms part of a readily removable assembly including mounting bosses 97 (see FIGS. 4, 6). The bosses 97 may be removably secured to actuating rods 98, which are shown internally threaded to accommodate an extension screw 99, so that the effective overall length of the rod 98—99 may be adjustably determined and clamped, as by a lock nut 100.

The tool-tripping mechanism may include a downwardly projecting member or lug 101 to which the rear end of rod 99 is secured, as by a clamp nut 102. We have shown wrench flats 103 at the end of the screw rod 99, so as to permit adjustment of overall length of the trip rod 98—99 in setting up for a particular operation. For proper support of the tripping mechanism, we may rely solely on the sliding engagement, at 104, for the rod 98 in the turret-mounting bracket or base 36; however, we prefer to employ additional guide means, such as rods 105 (FIG. 3), which may be anchored at 106 to the turret and at 107 to the turret-mounting bracket 36. The trip member 101 may then be formed with outwardly stretched arms 108 (FIG. 4) embracing the threading-spindle assembly and formed with suitable guide bosses 109 (FIG. 3) to ride the guide rods 105.

As frame references to determine die-trip and die-reset operations, we employ a bracket 110 which may be secured to the front face of the power case, as shown in FIGS. 2 and 6, and which may carry an elongated threaded rod 111 along which a trip stop 112 may be selectively positioned and along which a rest abutment 113 may be firmly positioned. The trip abutment 112 is shown projecting more towards the spindle axis than is the reset abutment 113; and in the form shown, this is for the purpose of permitting a latch 114 to ride idly over the abutment 113 during a feeding stroke and yet to permit a rigid abutment 115 on the trip arm 101 to be intercepted only by the trip abutment 112. In the drawback stroke, the latch 114 will have been urged by leaf spring 116 to the position shown in FIG. 6 so as to intercept the flat face of abutment 113; and, since latch 114 is prevented by abutment 115 from clockwise rotation, a firm reference is available for resetting the die when latch 114 is intercepted by abutment 113 during drawback, whereupon the tap or die-reset mechanism, including fork 96, may be actuated to set the cutting tool for another cutting operation.

In certain set-ups the stroke of the tool turret 16 is relatively long and the die head mounted thereon is relatively large. The die trip assembly, which includes the number 101, the trip rods 98, the fork 96, and its coacting setting sleeve of the die head, is held against axial displacement by the frictional engagement of the setting sleeve with the chaser blocks of the die head in all stations except the working station where axial displacement of the assembly is under the control of the abutment 112 for tripping and 113 for resetting. The return or drawback cycle of the tool turret 16 is always accomplished at high speed, and when relatively large die heads are used the inertia force of the die trip assembly and setting sleeve is sufficient to overcome the friction between the setting sleeve and chaser blocks and snap the die head open when the turret is abruptly stopped at the end of the drawback. Also when loading spring 70 is set for relatively light pressure for cutting fine pitch threads the threading spindle 60 carrying the die head, and the trip assembly will bounce on spring 70 when the tool turret is abruptly stopped, and the recuperation of the spindle and die head is so rapid the trip assembly drags and snaps the die head open. In either case the result is that an open die head is presented to the work in the working station.

The arrangement of FIG. 7 comprises essentially a removable fixed abutment, constituted by the leftward-extending arm of a bell crank 118, pivoted at 119 on a bracket 117 forming part of or secured to the front face of the turret drum. A leaf spring 120 normally urges bell crank 118 to the down-position shown in dotted lines, so that it may limit rearward movement of trip arm 101 (and therefore of the tool and threading spindle) upon reaching the fully drawn-back position. Preferably, abutment 113 arrests the threading spindle and die trip assembly at a location forward of the fully retracted position, by an amount equal to the space between pin 68 and the left end of slots 69 plus the required travel of the setting sleeve over the chaser blocks, while the turret which includes sleeve 63 continues to full drawback position thus increasing the tension of springs 74, it being understood that the chaser blocks are collapsed as pin 68 engages the left end of slots 69.

Of course, the described mechanism for avoiding release of the die prohibits the transient compressing of the spring 70 in all stations except the working station. As was explained more fully above, the spring 70 furnishes the necessary pressure to start the threading tool in the work piece. To permit the next use of the spring 70 (i.e. for starting pressure) and to prevent the possibility of the threading tool striking the work piece with the threading spindle rigidly located axially by means of the bell crank 118, we utilize means (responsive to the angular relative movement of the turret drum 17 and of the rest of the machine during indexing) to release the stop function of bell crank 118 on arm 101.

In the form shown, an arcuate cam 122 is mounted on a rod 123 slidably guided in the power case 14 and secured to the turret crosshead 20 and therefore continuously maintained in the same axial relationship with the bell crank 118 in the working station only. In any station other than the working station the bell crank 118 is maintained (as shown by dotted lines in FIG. 7) to act as an abutment against which trip arm 101 rests, thereby preventing further retraction or bouncing of the threading spindle on spring 70. Upon indexing into the working position (at which position the threading spindle is located along the same longitudinal axis as the work spindle 12 and work piece 13; see FIG. 1), the lower arm of the bell crank 118 rides the cam 122 and is actuated clockwise to the position shown in full outline in FIG. 7. In this actuated position, the upper arm of the bell crank 118 is aligned with opening 121 in arm 101, and is therefore in position to enter the opening as the turret continues its forward motion while that of the threading spindle is restricted by the work as previously described.

Upon the completion of the threading operation, and as the turret drum 17 starts to index out of the working position, the bell crank 118 rides off the arcuate cam 122 on rod 123 and returns to the position shown in dotted outline in FIG. 7; this occurs just prior to full retraction of the threading spindle and die trip assembly which are drawn back in unison by springs 74 when latch 114 disengages the abutment 113 upon index, so that bell crank 118 may be poised to arrest the rearward movement of trip arm 101 and to assure that the die will remain set. The die will remain set and bell crank 118 will hold the threading spindle against rearward displacement due to bounce until it is again indexed into the working station. Then, upon indexing of the turret drum 17 into the threading position, bell crank 118 will again strike arcuate cam 122 on rod 123, and the upper arm of bell crank 118 will align with the hole in trip arm 101, in order to make starting pressure available.

It will be seen that we have disclosed ingenious mechanism for automatically accomplishing threading operations on a turret lathe of the character indicated. The threading operations may be of a wide variety, and no special thread-feed provisions need be made. Furthermore, all threading may be accomplished without increasing the working period for any given working station, that is, without having to arrest the main-cam cycle. Our mechanism is so compactly applicable to the turret lathe that the same machine may be set up for different threading operations at different stations.

While we have described our invention in detail for the preferred form shown, it will be understood that modifications may be made within the scope of the invention as defined in the claims which follow.

We claim:

1. In a machine of the character indicated, a work-rotating spindle and a threading spindle on the same axis, drive means connected to rotate both said spindles, feed means including a cam with a dwell and coacting with a reciprocable member for feeding said spindles relatively to each other, the drive connection to one of said spindles including axially spaced high and low speed gears on said one spindle, clutch means carried by said one spindle and shiftable between said gears for selective engagement therewith, spring means carried by said one spindle and continuously urging said clutch means in the direction for engagement with one of said gears to the exclusion of the other, latch means carried by said one spindle for releasably holding said clutch means in engagement with the other of said gears, trip means on said reciprocable member for said latch means, and a trip cam on said first mentioned cam coacting with said trip means to release said latch means during the dwell of said cam.

2. A machine according to claim 1, in which said clutch means includes an axially movable element projecting at the rear of said one spindle, and latch-resetting means engageable with said element on retraction of said one spindle by said first mentioned cam.

3. In a machine of the character indicated, frame means, a work-rotating spindle journalled in said frame means, a turret stem on an axis offset from but parallel to the spindle axis, a turret slidable on said stem and having a plurality of stations successively indexible to working relation with said spindle, feed means including a dwell for said turret, indexing means for said turret and operating in timed relation with a cycle of said feed means, a threading spindle carried by said turret at one station thereof and axially aligned with said work-rotating spindle when in the working station, means for continuously rotating said threading spindle throughout the feed cycle, threading-tool means keyed to said threading spindle with axial lost motion, drive means for said threading spindle including axially spaced high and low speed gears on said threading spindle, clutch means carried by said threading spindle and shiftable between said gears for selective engagement therewith, spring means carried by said threading spindle and urging said clutch means in the direction for engagement with one of said gears, latch means carried by said threading spindle for removably holding said clutch means in engagement with the other of said gears, a trip element for said latch means and carried by an unindexed part of said machine and located at the working station, whereby said clutch means can be shifted by tripping said latch only when said threading spindle is at the working station, and means operating in timed relation with said feed means and coordinated to occur during said dwell for actuating said trip element, whereby said clutch may be shifted only at the working station and only at the correct instant in the feed cycle at said station.

4. A machine according to claim 3, in which said spring is a compression spring and is carried by said threading spindle, and means lightly resiliently connecting said threading-tool means to said threading spindle and loading the same against said compression spring.

5. A machine according to claim 3, in which said clutch means includes an axially movable element projecting at the rear of said threading spindle, and latch-resetting means comprising a cam carried by said frame means in general alignment with said work-rotating spindle and engaging said projecting element during indexing and in the event that said latch means shall not have been reset by the time said threading spindle is indexed into the working station.

6. In a machine of the character indicated, frame means, a work-rotating spindle journalled in said frame means, means for continuously driving said work-rotating spindle, a tool-supporting turret indexible about a frame-based axis parallel to the axis of said spindle, feed means including a dwell for longitudinally feeding said turret on its axis, indexing means for said turret and operating in timed relation with a cycle of said feed means, a threading spindle bodily carried by said turret at one station thereof and aligned with the axis of said work-rotating spindle when in the working station, threading-tool means keyed to said threading spindle with axial lost motion, said lost motion being less than the total feed of said feed means but being of at least the extent of total feed of a threading-tool beyond the feed limit of said feed means, a compression spring preloaded against stops carried by said threading spindle and interposed between said threading spindle and said threading-tool means, resiliently urging said threading spindle and threading-tool means into abutment with said spring near that limit of lost motion which represents tool retraction, said threading-tool means being so set on said turret as to engage said threading-tool means with work supported by said work-rotating spindle prior to attainment of said dwell by a longitudinal amount less than the total lost motion characterizing the engagement of said threading-tool means to said threading spindle, whereby threading once started prior to said dwell may be continued during said dwell, and automatic means effective during said dwell for terminating said threading operation, said automatic means comprising a single drive means for both said work-rotating spindle and said threading spindle, connection thereof to one of said spindles including a two-speed transmission, said two-speeds being respectively greater and less than the drive speed for the other of said spindles and a trip mechanism to change the speed of said transmission at the end of said dwell.

References Cited in the file of this patent
UNITED STATES PATENTS

| | | |
|---|---|---|
| 1,592,009 | Simpson | July 13, 1926 |
| 1,805,998 | Schaerer | May 19, 1931 |
| 2,161,548 | Miller | June 6, 1939 |
| 2,718,950 | Lapsley | Sept. 27, 1955 |